(12) United States Patent
Chou et al.

(10) Patent No.: US 9,292,276 B1
(45) Date of Patent: Mar. 22, 2016

(54) METHOD AND SYSTEM FOR UTILIZING CHANGE PACKAGES

(71) Applicants: Chia-Sheng Isaac Chou, Carlisle, MA (US); Michael Jacques Booker, Watertown, MA (US)

(72) Inventors: Chia-Sheng Isaac Chou, Carlisle, MA (US); Michael Jacques Booker, Watertown, MA (US)

(73) Assignee: MICRO FOCUS (IP) DEVELOPMENT LIMITED, Newbury, Berkshire (GB)

( * ) Notice: Subject to any disclaimer, the term of this patent is extended or adjusted under 35 U.S.C. 154(b) by 0 days.

(21) Appl. No.: 14/446,214

(22) Filed: Jul. 29, 2014

(51) Int. Cl.
*G06F 9/44* (2006.01)
*G06F 9/445* (2006.01)

(52) U.S. Cl.
CPC ... *G06F 8/65* (2013.01); *G06F 8/71* (2013.01)

(58) Field of Classification Search
None
See application file for complete search history.

(56) References Cited

U.S. PATENT DOCUMENTS

| | | |
|---|---|---|
| 4,558,413 A | 12/1985 | Schmidt et al. |
| 4,809,170 A | 2/1989 | Leblang et al. |
| 5,278,979 A | 1/1994 | Foster et al. |
| 5,421,008 A | 5/1995 | Banning et al. |
| 5,428,737 A | 6/1995 | Li et al. |
| 5,428,776 A | 6/1995 | Rothfield |
| 5,553,282 A | 9/1996 | Parrish et al. |
| 5,600,834 A | 2/1997 | Howard |
| 5,649,200 A | 7/1997 | Leblang et al. |
| 5,659,735 A | 8/1997 | Parrish et al. |
| 5,721,900 A | 2/1998 | Banning et al. |
| 5,752,245 A | 5/1998 | Parrish et al. |
| 5,884,306 A | 3/1999 | Bliss et al. |
| 5,903,897 A | 5/1999 | Carrier, III et al. |
| 5,909,689 A | 6/1999 | Van Ryzin |
| 5,913,063 A | 6/1999 | McGurrin et al. |
| 5,956,513 A | 9/1999 | McLain, Jr. |
| 6,003,034 A | 12/1999 | Tuli |
| 6,055,544 A | 4/2000 | DeRose et al. |
| 6,098,073 A | 8/2000 | O'Rourke |
| 6,112,024 A | 8/2000 | Almond et al. |
| 6,216,140 B1 | 4/2001 | Kramer |
| 6,247,047 B1 | 6/2001 | Wolff |
| 6,256,773 B1 * | 7/2001 | Bowman-Amuah ...... G06F 8/71 707/999.202 |
| 6,272,678 B1 | 8/2001 | Imachi et al. |
| 6,405,364 B1 | 6/2002 | Bowman-Amuah |
| 6,438,743 B1 | 8/2002 | Boehm et al. |
| 6,457,170 B1 | 9/2002 | Boehm et al. |
| 6,487,713 B1 | 11/2002 | Cohen et al. |
| 6,493,732 B2 | 12/2002 | Aoyama et al. |
| 6,502,133 B1 | 12/2002 | Baulier et al. |
| 6,557,012 B1 | 4/2003 | Arun et al. |
| 6,564,369 B1 | 5/2003 | Hove et al. |
| 6,626,953 B2 | 9/2003 | Johndrew et al. |
| 6,662,357 B1 | 12/2003 | Bowman-Amuah |

(Continued)

OTHER PUBLICATIONS

Author: Conradi et al., Title: Version Models for Software Conguration Management, Published by: ACM computing survery, vo. 30, No. 2, pp. 231-282, Jun. 1998.*

(Continued)

*Primary Examiner* — Wei Zhen
*Assistant Examiner* — Hossain Morshed
(74) *Attorney, Agent, or Firm* — DLA Piper LLP (US)

(57) ABSTRACT

Systems and methods described herein may generate a change package comprising one or more changes to a configuration of a segment. The change package may comprise a separate entry for each segment. Each entry may comprise each change associated with the respective segment.

46 Claims, 20 Drawing Sheets

(56) References Cited

U.S. PATENT DOCUMENTS

| | | | |
|---|---|---|---|
| 6,681,382 B1 | 1/2004 | Kakumani et al. | |
| 6,715,108 B1 | 3/2004 | Badger et al. | |
| 6,766,334 B1 | 7/2004 | Kaler et al. | |
| 6,789,252 B1 | 9/2004 | Burke et al. | |
| 6,901,407 B2 | 5/2005 | Curns et al. | |
| 6,978,281 B1 | 12/2005 | Kruy et al. | |
| 7,089,552 B2 | 8/2006 | Atallah | |
| 7,146,608 B1 | 12/2006 | Newman et al. | |
| 7,251,655 B2 | 7/2007 | Kaler et al. | |
| 7,289,973 B2 | 10/2007 | Kiessig et al. | |
| 7,437,722 B2 | 10/2008 | Poole | |
| 7,614,038 B2 | 11/2009 | Poole | |
| 7,769,787 B2 | 8/2010 | Hailpern et al. | |
| 7,856,615 B2* | 12/2010 | Clemm | G06Q 10/06 717/101 |
| 8,032,573 B2 | 10/2011 | Richard | |
| 8,316,224 B2* | 11/2012 | Vidal | G06F 8/71 713/1 |
| 8,341,590 B1* | 12/2012 | Poole | G06F 8/71 717/101 |
| 8,473,893 B2 | 6/2013 | Poole | |
| 8,548,967 B1 | 10/2013 | Poole | |
| 8,667,465 B2 | 3/2014 | Poole | |
| 8,719,786 B2* | 5/2014 | Waddington | G06F 8/71 717/122 |
| 2001/0049697 A1 | 12/2001 | Johndrew et al. | |
| 2002/0004824 A1* | 1/2002 | Cuan | G06F 17/3089 709/208 |
| 2002/0062475 A1 | 5/2002 | Iborra et al. | |
| 2002/0091990 A1 | 7/2002 | Little et al. | |
| 2002/0107840 A1 | 8/2002 | Rishe | |
| 2003/0051230 A1 | 3/2003 | Molchanov et al. | |
| 2003/0126003 A1 | 7/2003 | vom Scheidt et al. | |
| 2003/0200098 A1 | 10/2003 | Geipel et al. | |
| 2004/0015842 A1 | 1/2004 | Nanivadekar et al. | |
| 2004/0044996 A1 | 3/2004 | Atallah | |
| 2004/0056903 A1 | 3/2004 | Sakai | |
| 2004/0260693 A1 | 12/2004 | Chen et al. | |
| 2005/0086588 A1 | 4/2005 | McGregor et al. | |
| 2005/0114479 A1 | 5/2005 | Watson-Luke | |
| 2006/0015851 A1 | 1/2006 | Poole | |
| 2006/0031811 A1 | 2/2006 | Ernst et al. | |
| 2006/0070019 A1 | 3/2006 | Vishnumurty et al. | |
| 2006/0150148 A1 | 7/2006 | Beckett et al. | |
| 2006/0253588 A1 | 11/2006 | Gao et al. | |
| 2007/0011649 A1 | 1/2007 | Venolia | |
| 2007/0061787 A1 | 3/2007 | Trowbridge | |
| 2007/0118888 A1* | 5/2007 | Styles | G06F 21/575 726/5 |
| 2007/0143752 A1* | 6/2007 | Clemm | G06F 8/71 717/178 |
| 2007/0143827 A1 | 6/2007 | Nicodemus et al. | |
| 2007/0250575 A1* | 10/2007 | Tseitlin | G06F 8/30 709/205 |
| 2008/0098037 A1* | 4/2008 | Neil | G06F 17/30297 |
| 2008/0148233 A1* | 6/2008 | Clemm | G06F 8/71 717/121 |
| 2008/0148234 A1* | 6/2008 | Clemm | G06F 17/30377 717/121 |
| 2009/0307650 A1 | 12/2009 | Saraf et al. | |
| 2010/0198799 A1 | 8/2010 | Krishnan et al. | |
| 2013/0111429 A1 | 5/2013 | Poole | |
| 2014/0096124 A1* | 4/2014 | Bond | A63F 13/10 717/171 |
| 2014/0215436 A1* | 7/2014 | DeLuca | G06F 8/71 717/121 |

OTHER PUBLICATIONS

Conradi—Titile: Version Models for Software Conguration Management, ACM computing survey, vo. 30, No. 2, pp. 231-282, Jun. 1998.*

Damon Poole et al., "Steam-Based Architecture for SCM", http://accurev.com/whitepaper/pdf/accurev_streams.pdf, Jun. 6, 2005 (15 pages).

"Agile: Branches vs. Streams", Dave on SCM, Sep. 26, 2007, http://daveonscm.blogspot.com (5 pages).

Bernhard Westfechtel et al., "A Layered Architecture for Uniform Version Management", IEEE Transactions on Software Engineering, vol. 12, No. 12, pp. 1111-1133, Dec. 2001.

Antonio Massari et al., "Supporting Mobile Database Access Through Query by Icon", Distributed and Parallel Databases, vol. 4, No. 3, pp. 249-269, Jul. 1996.

"Jira Documentation", http://www.usit.uio.no/prosjekter/gorilla/doku/jira-manual.pdf, pp. 1-376 (2005).

David B. Leblang, "Managing the Software Development Process with ClearGuide", Software Configuration Management, LNCS, vol. 1235, pp. 66-80, May 18-19, 1997.

U.S. Appl. No. 13/716,638.
U.S. Appl. No. 12/059,529.
U.S. Appl. No. 12/001,708.
U.S. Appl. No. 12/551,923.
U.S. Appl. No. 12/001,710.
U.S. Appl. No. 10/894,964.
U.S. Appl. No. 10/894,697.

* cited by examiner

1010

1040

1060

1070

METHOD AND SYSTEM FOR UTILIZING CHANGE PACKAGES

CROSS-REFERENCE TO RELATED APPLICATIONS

This application is related to U.S. patent application Ser. No. 13/716,638, filed Dec. 17, 2012 (now Abandoned), U.S. patent application Ser. No. 10/894,697 filed Jul. 19, 2004 (now U.S. Pat. No. 7,437,722 issued Oct. 14, 2008), U.S. patent application Ser. No. 10/894,964 filed Jul. 19, 2004 (now U.S. Pat. No. 7,614,038 issued Nov. 3, 2009), U.S. patent application Ser. No. 12/001,710 filed Dec. 12, 2007 (now U.S. Pat. No. 8,341,590 issued Dec. 25, 2012), U.S. patent application Ser. No. 12/551,923 filed Sep. 1, 2009 (now U.S. Pat. No. 8,473,893 issued Jun. 25, 2013), U.S. patent application Ser. No. 12/001,708 filed Dec. 12, 2007 (now U.S. Pat. No. 8,548,967 issued Oct. 1, 2013), and U.S. patent application Ser. No. 12/059,529 filed Mar. 31, 2008 (now U.S. Pat. No. 8,667,465 issued Mar. 4, 2014). All of the foregoing are incorporated by reference in their entireties.

DETAILED DESCRIPTION OF SEVERAL EMBODIMENTS

Systems and methods described herein may enable creation and modification of change packages for software development environments. Such environments may include configuration management systems using change packages to track changes to a project and allow those changes to be replicated, augmented, reverted, etc.

TABLE 1

| | | Change Package | | | |
|---|---|---|---|---|---|
| Work item/ issue no. | Element ID | Basis ver | Head ver | Trans | Trans_end |
| 1001 | 32 | 312/1 | 312/2 | 10 | int_max |
| 1001 | 50 | 312/8 | 312/10 | 10 | int_max |
| 1005 | 50 | 312/10 | 312/11 | 11 | int_max |

Table 1 is an example of a basic change package including two software component versions. Each pair of software component head and basis versions may represent a history of changes to an issue resolution that completes a work item. In table 1, the work item/issue no. may be an identifier (ID) of a work item (e.g., a change request). The element ID may be an identifier of an element (e.g., a file or directory) in the system which may provide a unique ID for every file or directory in the system. For example, when a new file is added, it may be assigned a unique element ID number. Therefore if the name of the file changes, or it is moved to another directory, or other changes are made, the element ID number may allow it to be identified and/or tracked. Every action that happens in the system may be given a sequential transaction number. The trans column may include a beginning transaction number, and the trans_end column may include an end transaction number, indicating a series of transactions for which the change package information represented in the table row for the work item is valid. The head version may be the element version that is included in a change package, and the basis version may be the prior direct ancestor version of the head version. A single change in the change package may be denoted by a content change between the basis version and the head version.

Figure 2A:
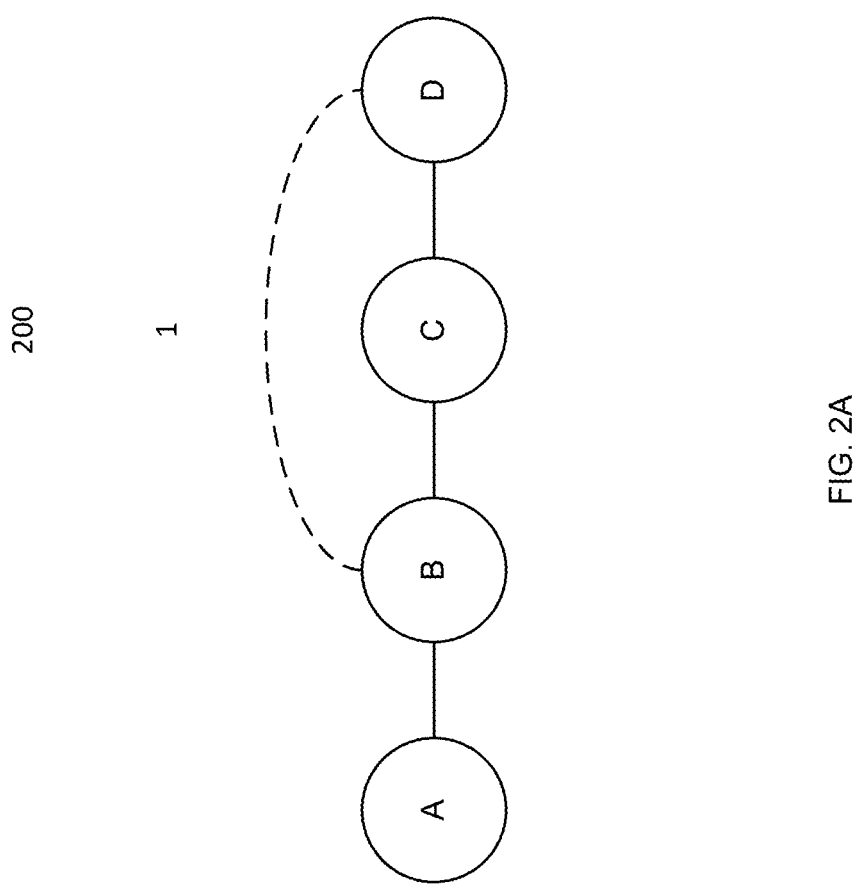
FIGS. 2A-2D are element version segments associated with change packages according to an embodiment of the invention.

FIG. 2A is an element version segment 200 associated with the change package of Table 1. Each circle denotes an element version. The edge between two circles denotes the ancestry relationship. In this example 200, each version is descended from the previous version, so version A is the first version, version B is the second version, etc. The basis version for change package #1, shown as a dotted line, is version B, and the head version for change package #1 is version D. The segment B-D may represent a developer working on a work item associated with change package #1. Changes in change package #1 may include content differences between version B and D. For an example use case including an element, see interface 1000 of FIG. 10A, which is described in greater detail below.

As will be described in greater detail below, systems and methods presented herein may enable development and use of change packages such as that of Table 1 and other change packages with additional features. For example, change packages may allow for discrete changes and multiple tasks to be done at the same time without keeping separate records. Also, logical changes may be tracked and inserted in multiple places so that a new change package may not be required every time the same logical change is applied.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connection). Connections between computers may use any protocols, including connection oriented protocols such as TCP or connectionless protocols such as UDP. Any connection through which at least two computers may exchange data can be the basis of a network.

Figure 1:
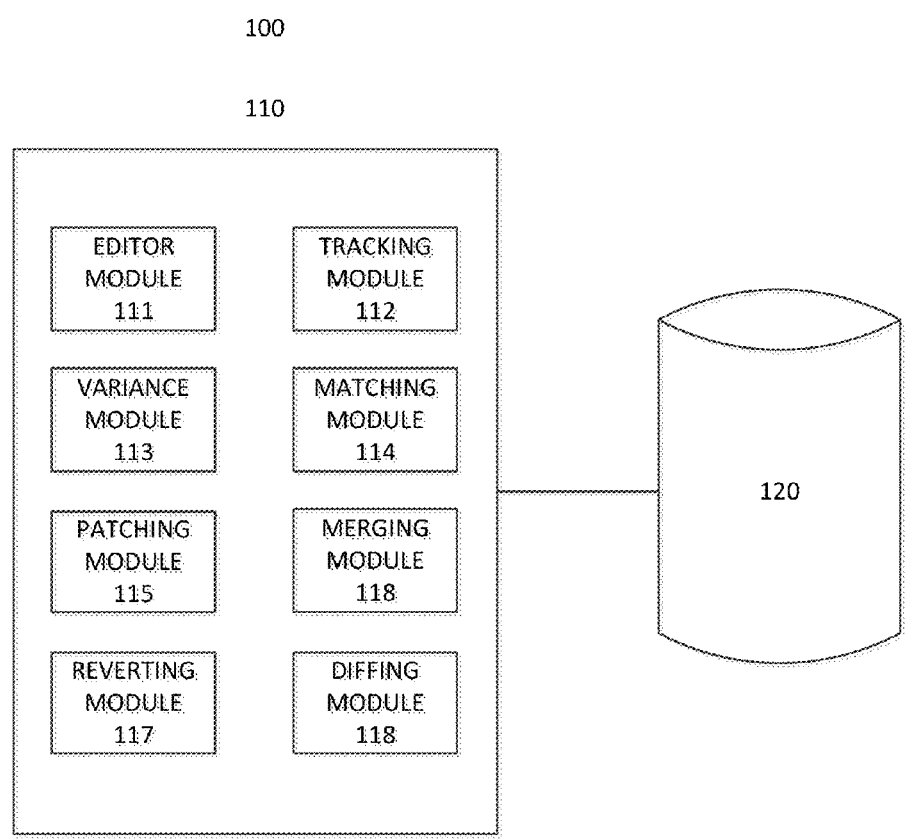
FIG. 1 is a system according to an embodiment of the invention.

FIG. 1 is a system 100 according to an embodiment of the invention. The system 100 may provide a software development environment which may enable a user to create and modify programs. The system 100 may include one or more processors 110 and one or more databases 120. The system 100 may also include one or more modules, which may comprise hardware and/or software run by the processor and/or other elements of the system 100. Modules may include an editor module 111, a tracking module 112, a variance module 113, a matching module 114, a patching module 115, a merging module 116, a reverting module 117, a diffing module 118, and/or other modules. Features and functions of these modules are described in greater detail below.

Figure 3:
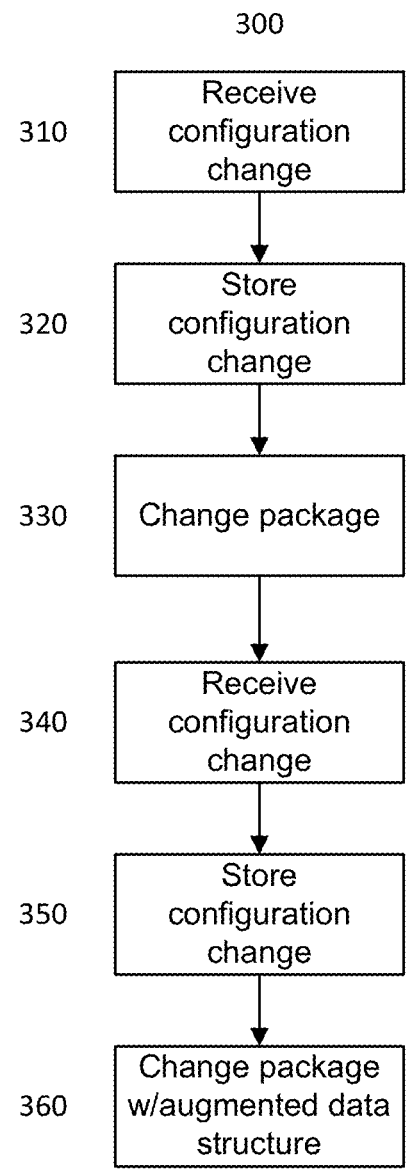
FIG. 3 is a change package creation process according to an embodiment of the invention.

FIG. 3 is a change package creation process 300 according to an embodiment of the invention. A change package may be created when changes are associated with a work item for the first time. In 310, a configuration change may be received. For example, a user may enter a change into a user interface (UI), and these may be received by the editor module 111. In 320, the change may be applied by the editor module 111 and stored in the database 120. In 330, the tracking module 112 may record the change in a change package. At this point, the change package may appear as shown above in Table 1, for example. For an example use case of change package creation, see interface 1010 of FIG. 10B, which is described in greater detail below. A change package may be amended after its creation to include more changes made to accomplish the work item. In 340, the editor module 111 may receive another change. In 350, the change may be applied by the editor module 111 and stored in the database 120. In 360, tracking module 112 may record the change in the change package. At this point, the change package may have an augmented structure. The augmentation may allow further work on an issue resolution to be correctly recorded even after the same software component has changed for another work item, which may be a common occurrence in a software development environment that involves multiple developers. The process 300 of this example includes two changes, but any number of changes may take place, and the tracking module 112 may update the change package accordingly. Table 2 provides an example of an augmented change package.

TABLE 2

Augmented Change Package

| Work item/ issue no. | Element ID | Basis ver | Head ver | Trans | Trans end |
|---|---|---|---|---|---|
| 1001 | 32 | 312/1 | 312/2 | 10 | int_max |
| 1001 | 50 | 312/8 | 312/9 | 10 | int_max |
| 1001 | 50 | 312/9 | 312/10 | 10 | int_max |
| 1005 | 50 | 312/10 | 312/11 | 11 | int_max |
| 1001 | 50 | 312/11 | 312/12 | 12 | int_max |

Figure 2B:
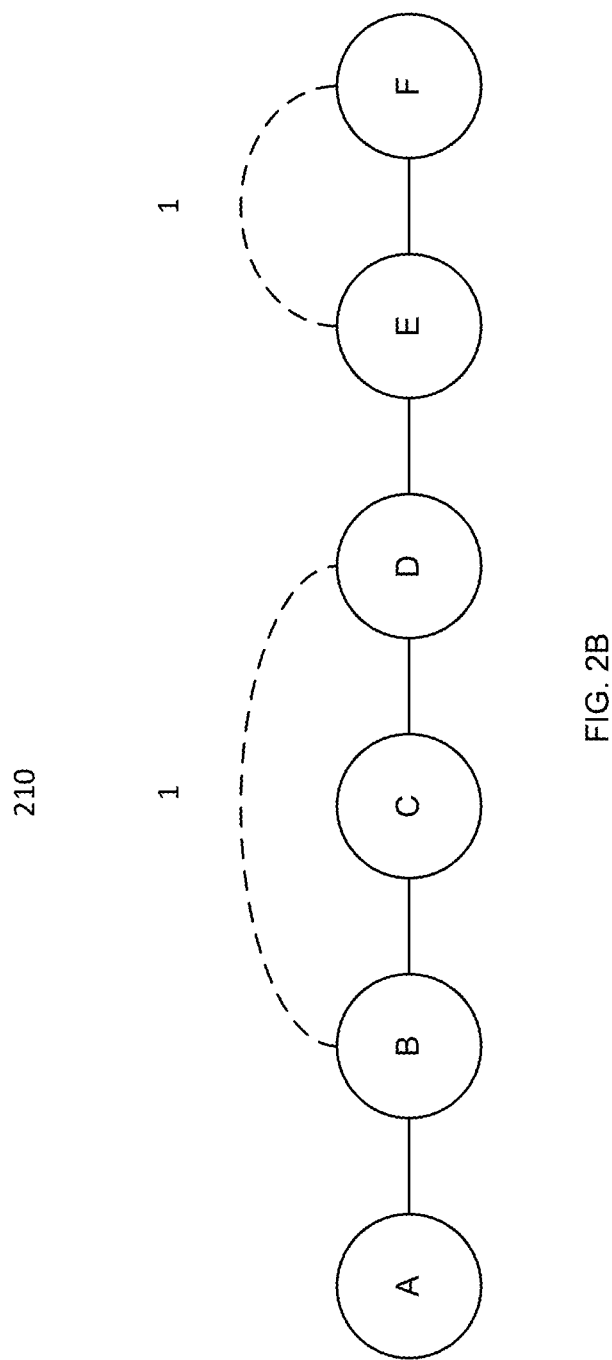

FIG. 2B is an element version segment 210 associated with the change package of Table 2. In this example 210, each version is descended from the previous version. Change package #1 includes two segments, one from version B to D, and one from version E to F. Note that the change package does not include the segment from D to E. Thus, changes made between D and E may have been made elsewhere (e.g., by another user and/or via another computer system 100), and may be for a different work item, but the change package may still be constructed and applied due to the augmented data structure. For example, a user may have worked on the work item associated with change package #1 from version B to D, worked on a different work item from D to E, and then returned to the work item associated with change package #1 from E to F. Without the augmented data structure, change packages may require every change to be included, so a change package skipping the segment from D to E may not be possible. For an example use case including an augmented segment, see interface 1020 of FIG. 10C, which is described in greater detail below. For an example use case including an augmented segment with multiple change packages, see interface 1030 of FIG. 10D, which is described in greater detail below.

The augmented data structure may provide one entry for each of the software component versions included in the change package. Each entry may include a software component ID, a head version specification, a basis version specification, the transaction number with which the entry was recorded, and the transaction number for which this particular entry expires, as discussed above.

The data structure may also enable searches for change packages that contain a particular software component version in a software development branch, change packages that are dependent on one another due to having a common software component version, change packages that are incomplete due to a missing software component version that is not the starting version, etc. An expired entry may not contribute to the contents of a change package if a query is performed at a transaction level that is greater than the entry's expiration transaction. This feature may provide historical reporting of a change package.

Change package variants may also be generated and applied by the system 100. Code changes in a change package may be used for a different branch of development. Changes may be derived from one branch where a fix was originally made to a branch that also needs the same fix by means of patching or merging, rather than making the changes from scratch in the other branch. Creating a variant of the original change package for the branch in which the fix was originally made may make it possible to apply the variant (and thus the same changes) to other branches. Change package variants may eliminate the duplication of work in creating and tracking the same work items that may otherwise be required in multiple development branches requiring the same change. Table 3 illustrates an example augmented data structure including a change package variant number:

TABLE 3

Change Package Variant

| issue no. | variant no. | eid | basis ver | head ver | trans | trans_end |
|---|---|---|---|---|---|---|
| 1001 | 0 | 50 | 312/8 | 312/9 | 10 | int_max |
| 1001 | 1 | 50 | 320/1 | 320/2 | 15 | int_max |
| 1001 | 2 | 50 | 120/5 | 120/6 | 20 | int_max |

In table 3, issue 1001 is the original change package. Patching issue 1001 to a workspace with ID 320 may create patched version 320/2 and variant 1 of issue 1001. Similarly, merging issue 1001 into a workspace with ID 120 may create merged version 120/6 and variant 2 of issue 1001. A change package variant may also be created to provide the same effect even if patching or merging is not required. In such a use case, the change package variant may have specialized changes in addition to common versions shared with the original change package.

Figure 4:
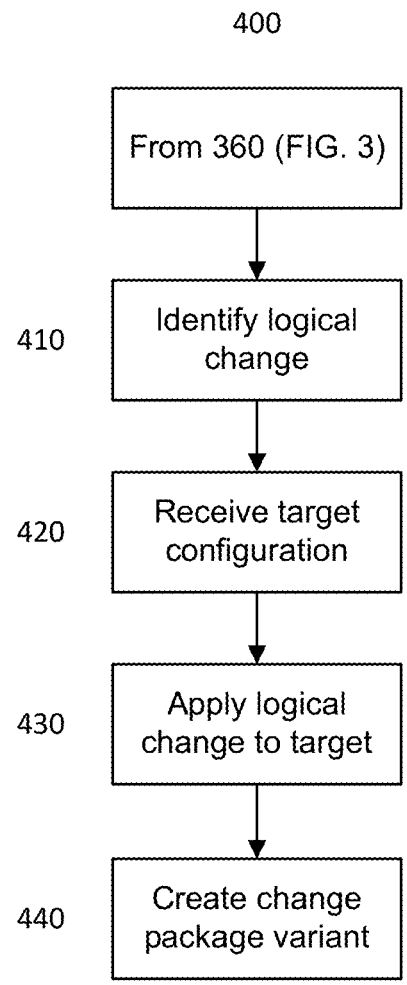
FIG. 4 is a change package variant creation process according to an embodiment of the invention.

FIG. 4 is a change package variant creation process 400 according to an embodiment of the invention. In 410, the variance module 113 may identify logical changes within a change package applied to a first configuration. In 420, the editor module 111 may receive a second configuration which may be a target configuration for the same logical changes identified within the change package. In 430, the editor module 111 may apply the logical change identified by the variance module 113 to the second configuration. In 440, the variance module 113 may create a new change package variant, which may include a change package incorporating the identified logical changes for the second configuration.

Figure 2C:
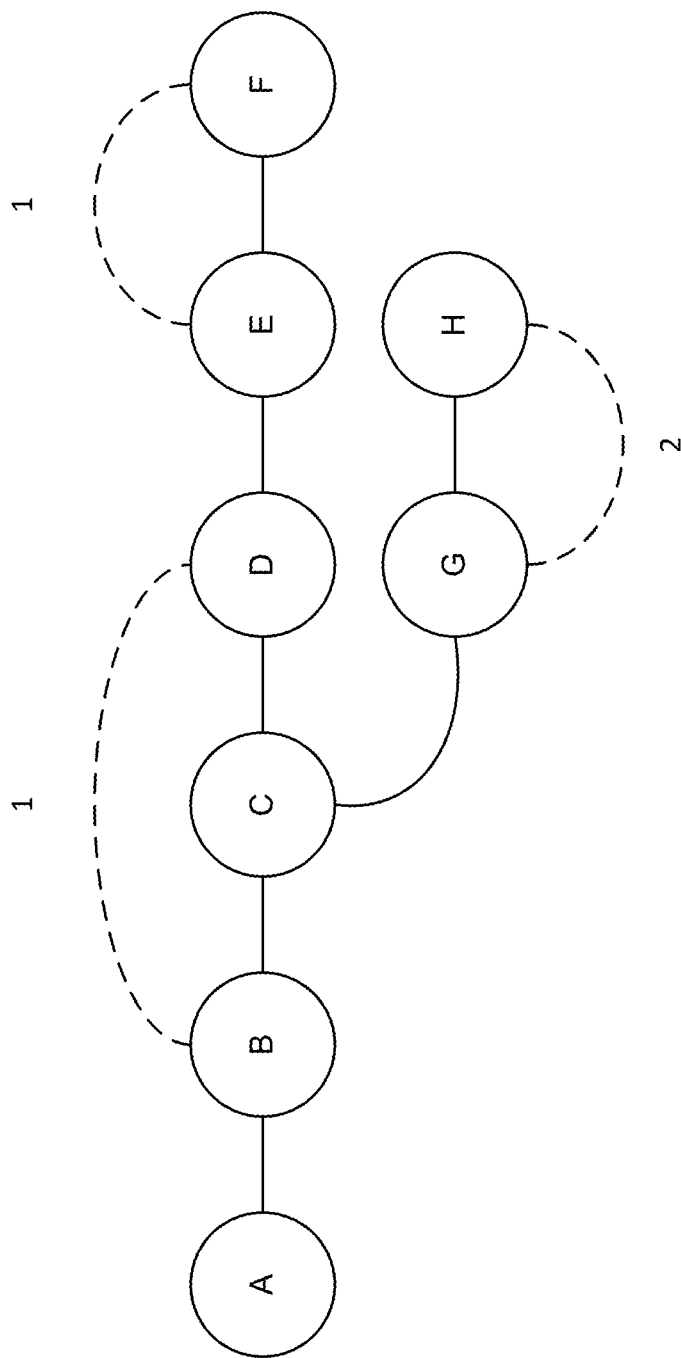

A development stream may contain element versions that are parts of one or more variants from the same change package. For example, FIG. 2C shows an element version segment 220 for a configuration with branching variants. Segment G-H may not be added to change package #1 because the segment does not form a linear version history with the segments B-D and E-F that are already in the change package. Segment G-H may be part of a different change package variant (change package #2). If a stream has any but not all of the element versions from a particular change package variant, this change package variant may be incomplete in the stream. An incomplete change package may indicate that not all changes required to accomplish a work item (change package) are present in a software development branch. The overall change package may be incomplete in a stream if any of its variants are incomplete in that stream.

Figure 5:
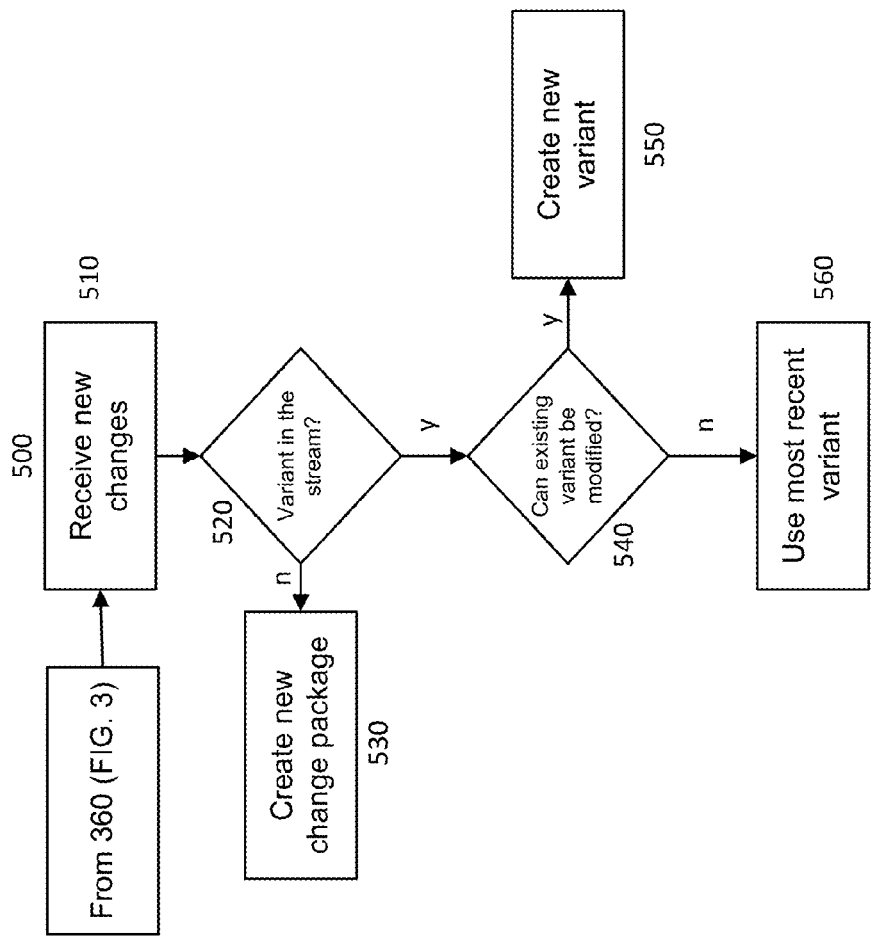
FIG. 5 is a change package matching process according to an embodiment of the invention.

As noted above, a change package may be amended after its creation. When a stream contains more than one variant for the same change package, an appropriate variant to amend may be chosen so that the integrity and completeness of the change package may be preserved. FIG. 5 is a change package matching process 500 according to an embodiment of the invention. The process 500 may observe the following rules: use the most transactionally recent variant level in the stream, create a new variant if amending the most transactionally recent variant would make the change package incomplete in the source stream, and/or if there is no variant in the stream (which may imply that the change package has not been patched or merged as discussed below), use the original change package. A most transactionally recent variant level may be a level that has the highest transaction number (e.g., see trans numbers in Tables 1-3; the third entry in Table 3 is the most transactionally recent in the table). For example, in 510, new changes may be received by the editor module 111. In 520 the matching module 114 may determine whether there is a variant in the stream. If not, in 530 the tracking module 112 may create a new change package for the new changes. If there is a variant in the stream, in 540 the matching module 114 may determine whether it can be modified. If so, in 550 the variance module 113 may create a new variant for the new changes. If not, in 560 the matching module may use the most transactionally recent variant in the stream. For an example use case including an amendment, see interface 1050 of FIG. 10F, which is described in greater detail below.

Figure 6:
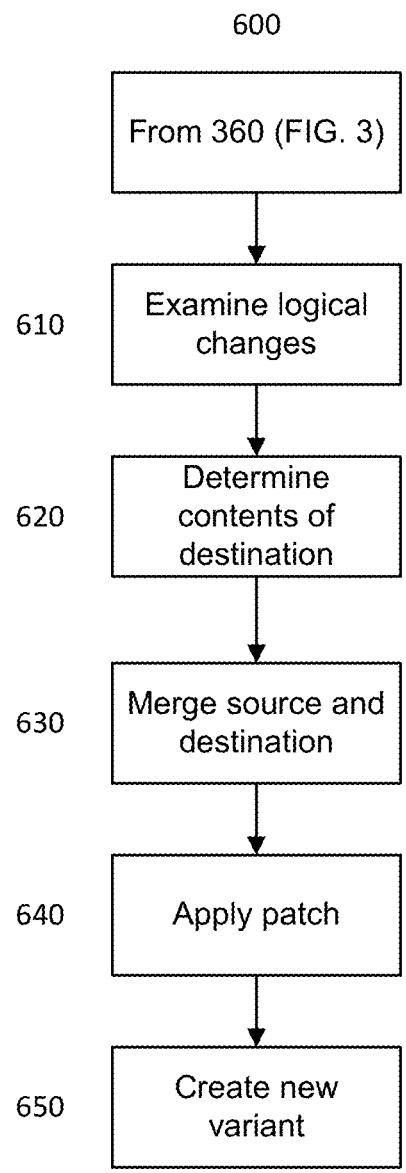
FIG. 6 is a patching process according to an embodiment of the invention.

Change packages may be patched from one stream (a source stream) to another (a destination stream). Patching a change package from a stream may include the use of all element versions contained in the stream that are part of the change package from all variants. FIG. 6 is a patching process 600 according to an embodiment of the invention. In 610, the patching module 115 may examine the logical changes in the source stream. In 620, the patching module 115 may determine the contents of the destination stream. If the stream receiving the patch already contains parts of the change package, only the element versions in the change package contained in the source stream that are not already in the destination stream may be patched. This may avoid proliferation of change package variants and may provide a way to make up missing versions so that an incomplete change package can be completed via a patch operation. In 630, the patching module 115 may compare the source and destination and merge them, which may include identifying the elements of the logical changes in the source stream that are not present in the destination stream and creating a patch including those elements. In 640, the patching module 115 may apply the patch to the destination stream. In 650, the tracking module 112 may create a new variant for the destination stream including the patched changes. For an example use case including a patch, see interface 1040 of FIG. 10E, which is described in greater detail below.

When an element has multiple discrete segments, each contiguous segment may be patched separately in one atomic operation. In such compound patch operations, multiple patch ancestries of an element may be recorded in the database 120. Segments may be patched as described above in ascending order in time (older segments before newer segments) to ensure that no changes are missed.

Figure 2D:
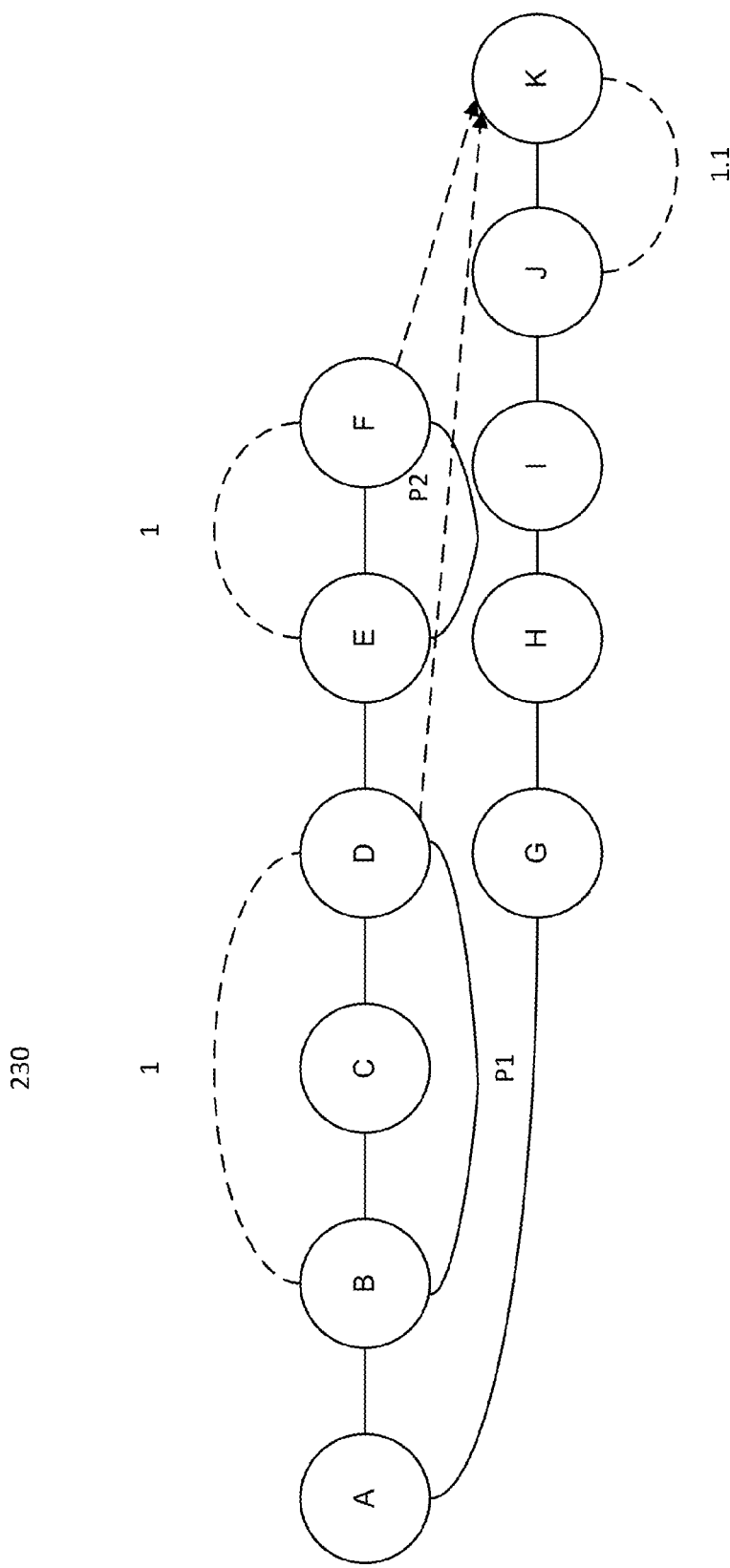

FIG. 2D is an element version segment 230 illustrating an example patch operation. Change package #1 containing versions B-D and E-F may be patched to version J to produce a new version K. Segment P1 may be patched first, then segment P2 may be patched. The new version K may have three ancestors, version J as a direct ancestor and two patch ancestors. Each patch ancestor may include two versions B-D and E-F. The change between segment J-K may be a logical equivalent of the change from B-D and E-F. The specific code of the segments J-K in the lower branch and B-D and E-F in the upper branch may be different. Patching with a variant may allow the logical changes made in the upper branch to be applied to the lower branch, even though the code may not be identical. Patching a change package to a stream or workspace may either amend or create a new variant in that stream or workspace, observing the variant amending rules described above.

Figure 7:
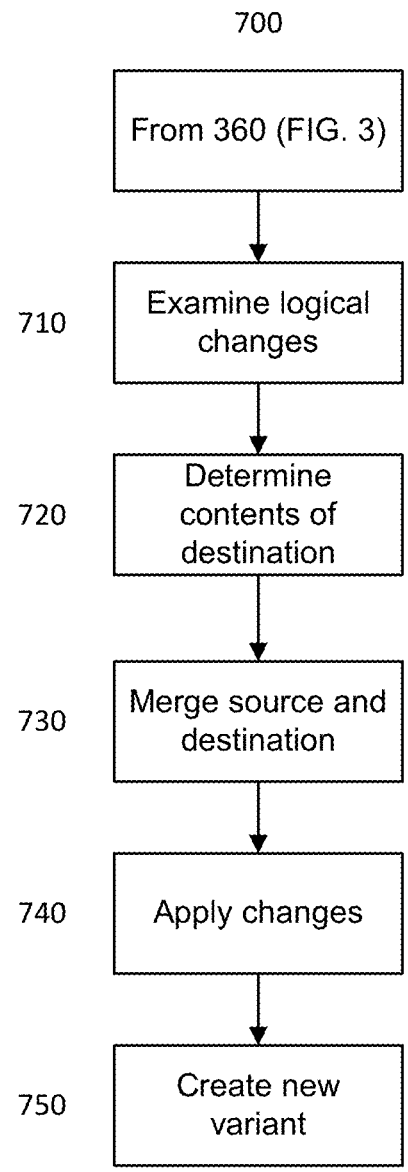
FIG. 7 is a merging process according to an embodiment of the invention.

Streams may also be merged together. FIG. 7 is a merging process 700 according to an embodiment of the invention. Merging with a change package may work the same way as patching except that all element versions between the most recent head version, V1, in the change package and the common ancestor of V1 and the version in the destination stream may be used for the operation. This may have the same effect of merging two branches using the latest version specified by the most recent version in the change package. In 710, the merging module 116 may examine the logical changes in the source stream. In 720, the merging module 116 may determine the contents of the destination stream. In 730, the merging module 116 may compare the source and destination and merge them. In 740, the merging module 116 may apply changes necessary to create a merged stream, which may include creating one stream with the merged elements from both streams and deleting any original streams. In 750, the merging module 116 may create a new variant for the merged stream including the changes.

Figure 8:
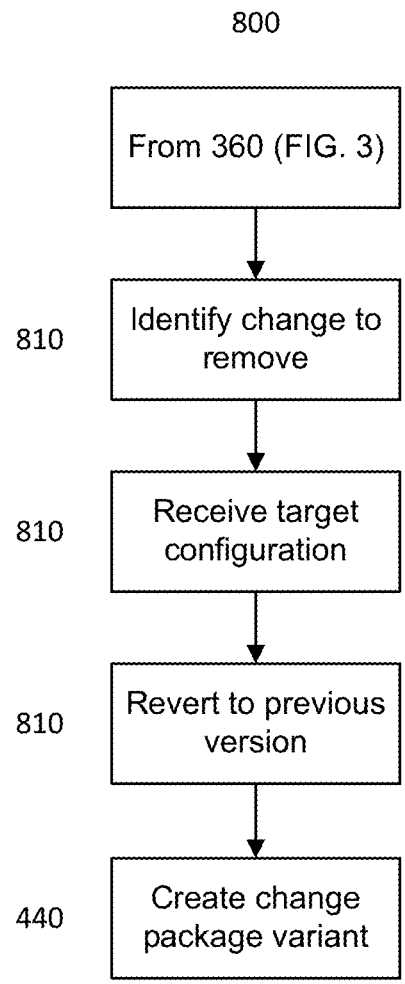
FIG. 8 is a reverting process according to an embodiment of the invention.

Change packages may be reverted, allowing changes to be undone. FIG. 8 is a reverting process 800 according to an embodiment of the invention. In a reverting operation, revert ancestries may be recorded instead of patch ancestries. When an element version has a revert ancestry connected to another version (the ancestor), the ancestor version may be taken out of the element's version history (ancestry tree). In 810, the reverting module 117 may identify logical changes to be removed from a configuration. In 820, the editor module 111 may receive a configuration which is to have the changes removed. In 830, the editor module 111 may apply the logical change identified by the reverting module 117 to the configuration. In 840, the variance module 113 may create a new change package variant, which may include a change package incorporating the revert ancestries for the operation and a removal of any ancestor versions that may no longer be relevant to the configuration. For an example use case including a reversion, see interface 1070 of FIG. 10H, which is described in greater detail below.

Reverting a change package with multiple discrete element segments may revert segments in descending order in time (newer segments may be reverted before older segments) to ensure that no changes are missed. As with the patch operation, revert of a change package (including all element segments) may be an atomic operation.

Figure 9:
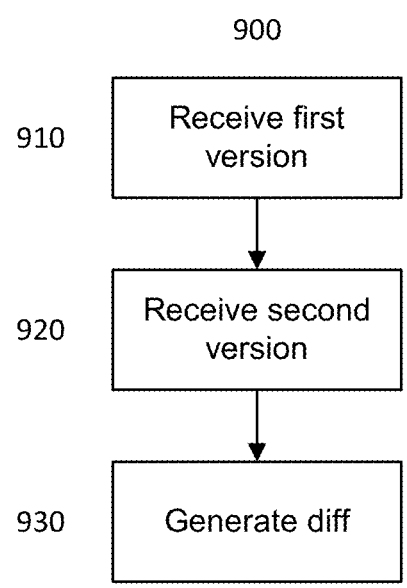
FIG. 9 is a diffing process according to an embodiment of the invention.

Displaying delta (diffs) between a starting version and a basis version of an element segment may provide a way for a user to inspect the code changes in a change package. When an element in a change package has multiple discrete segments, the user may also wish to see the overall changes or composite diffs of the change package. FIG. 9 is a diffing process 900 according to an embodiment of the invention. In 910, the diffing module 118 may receive a first version to be compared e.g., a starting version or a latest version), and in 920, the diffing module 118 may receive a second version to be compared (e.g., a basis version). In some embodiments, a user may select a package and a basis version and starting version may be the versions chosen automatically by the diffing module 118. In some embodiments, a user may be able to choose specific versions to compare. In 930, the diffing module 118 may generate the diff, which may be displayed to a user. While two versions are compared in this example process 900, any number of versions may be compared in some embodiments. A composite diff display may be based on the contents of the latest and basis versions of the element. Cumulative diffs from each segment may be highlighted in the corresponding sections in the latest and basis contents. Changes that are made between segments may not be in the change package and may be considered inactive changes. Inactive changes may not be highlighted in the display in some embodiments. When active changes and inactive changes overlap each other, a toggling display may be provided to the user to allow the user to see both sets of changes. For an example use case including a diff, see interface 1060 of FIG. 10G, which is described in greater detail below.

FIGS. 10A-10H are screenshots according to an embodiment of the invention. These screenshots present an example use case to which the systems and methods described above may be applied.

Figure 10A:
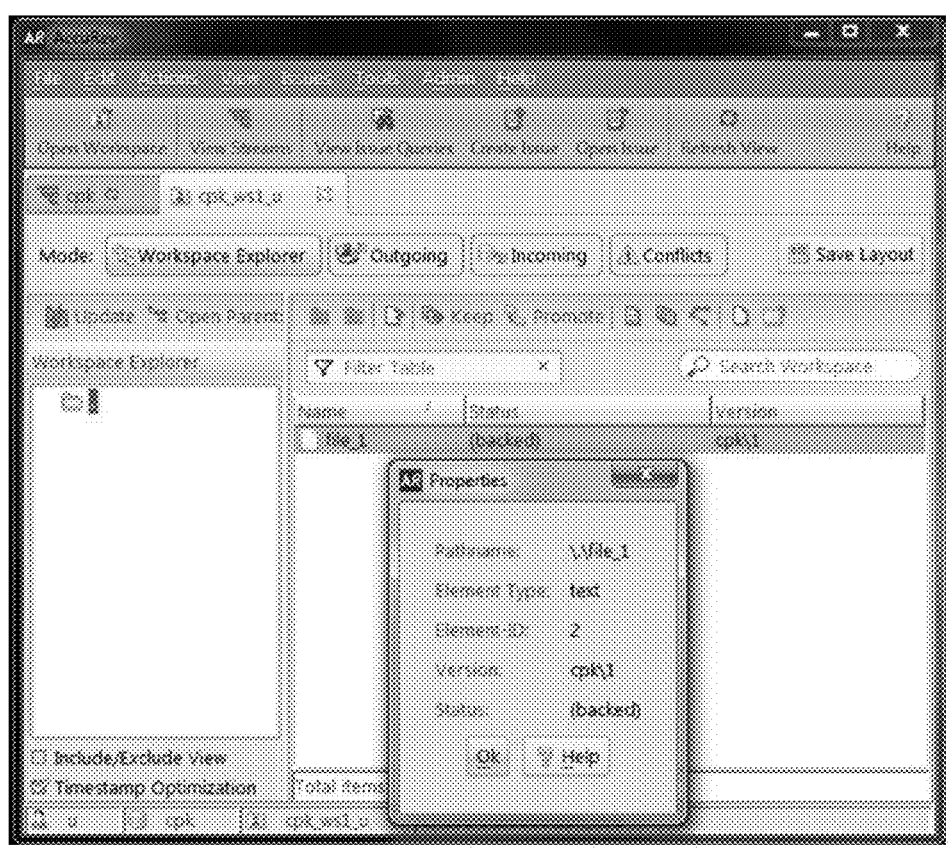
FIGS. 10A-10H are screenshots according to an embodiment of the invention.

FIG. 10A is a user interface 1000 illustrating an element. The element has an ID (2), a pathname (\.\file_1), and a version (cpk\1). The version display may include a stream or workspace name, a forward slash, and a version number. Thus, the example in the interface 1000 may represent a first version in a stream named cpk.

Figure 10B:
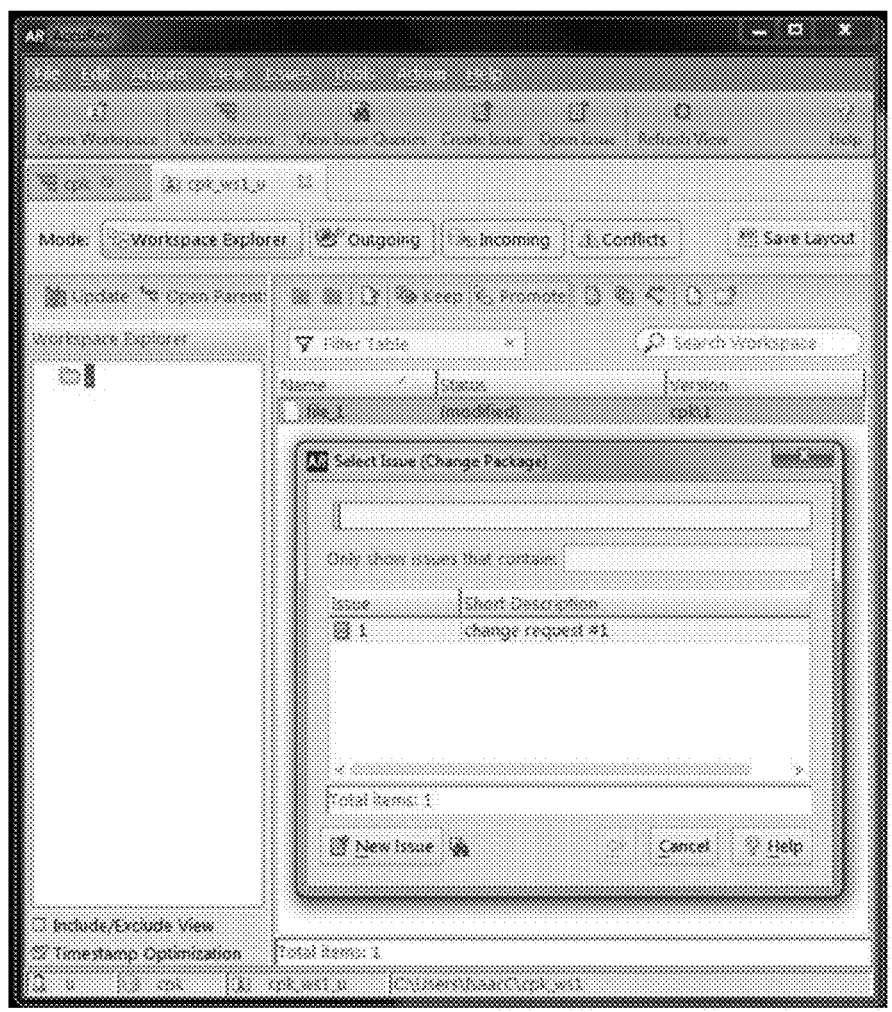

FIG. 10B is a user interface 1010 illustrating a change package creation. A user may enter an issue number (e.g., 1) when adding a modified element (file_1) to the system. Changes associated with the modified element may be made, and change package #1 may be created to include the changes.

Figure 10C:
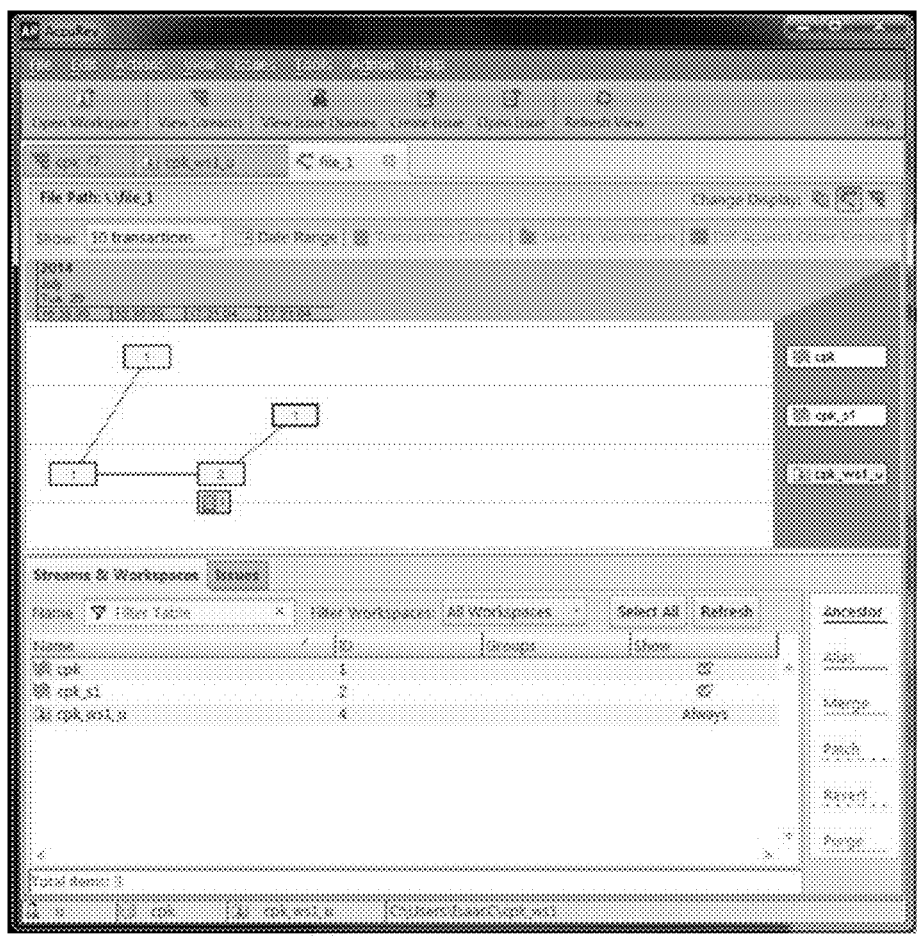

FIG. 10C is a user interface 1020 illustrating an element version history for an element (\.\file_1, with element ID 2). Version 2 of the element may be include in change package #1, as indicated by the icon for the change request below the version display. Version 1 of the element may be the basis for change package #1.

Figure 10D:
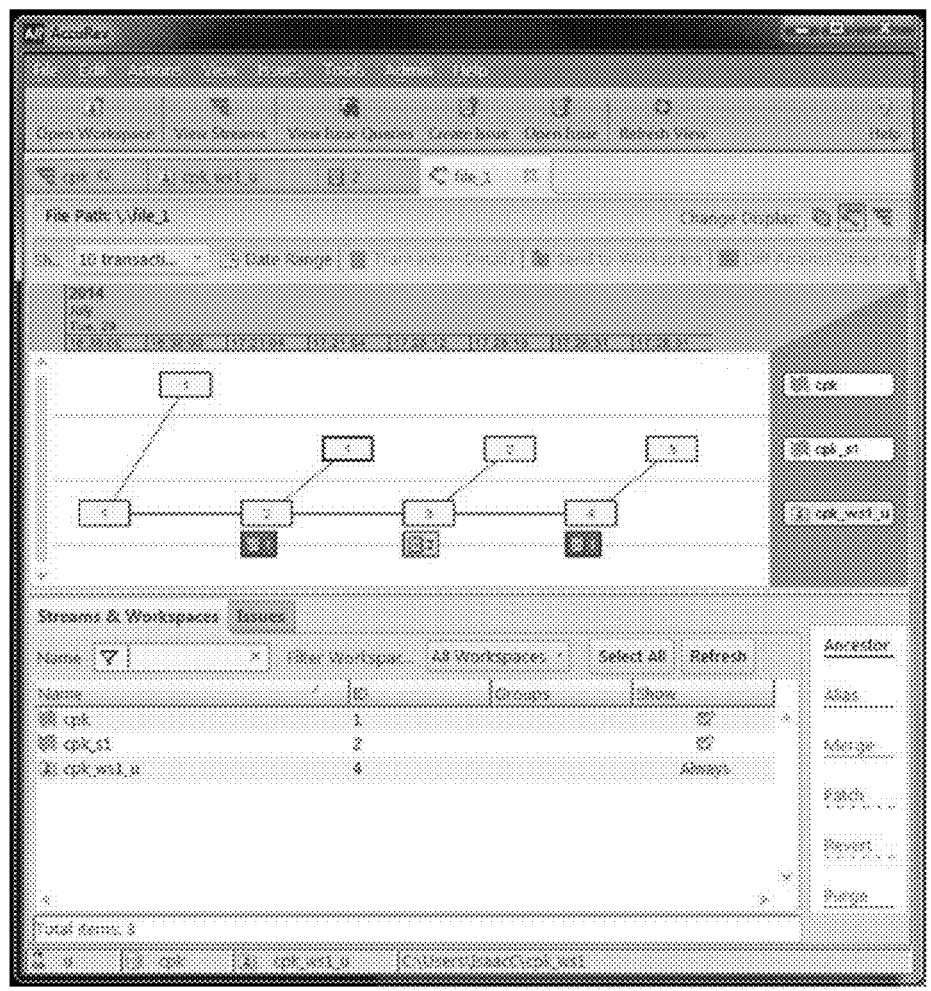

FIG. 10D is a user interface 1030 illustrating an element version history for two change packages, change package #1 and change package #2. Two discrete changes (e.g., version 2 and version 4) may be included in change package #1. One discrete change (e.g., version 3) may be included in change package #2.

Figure 10E:
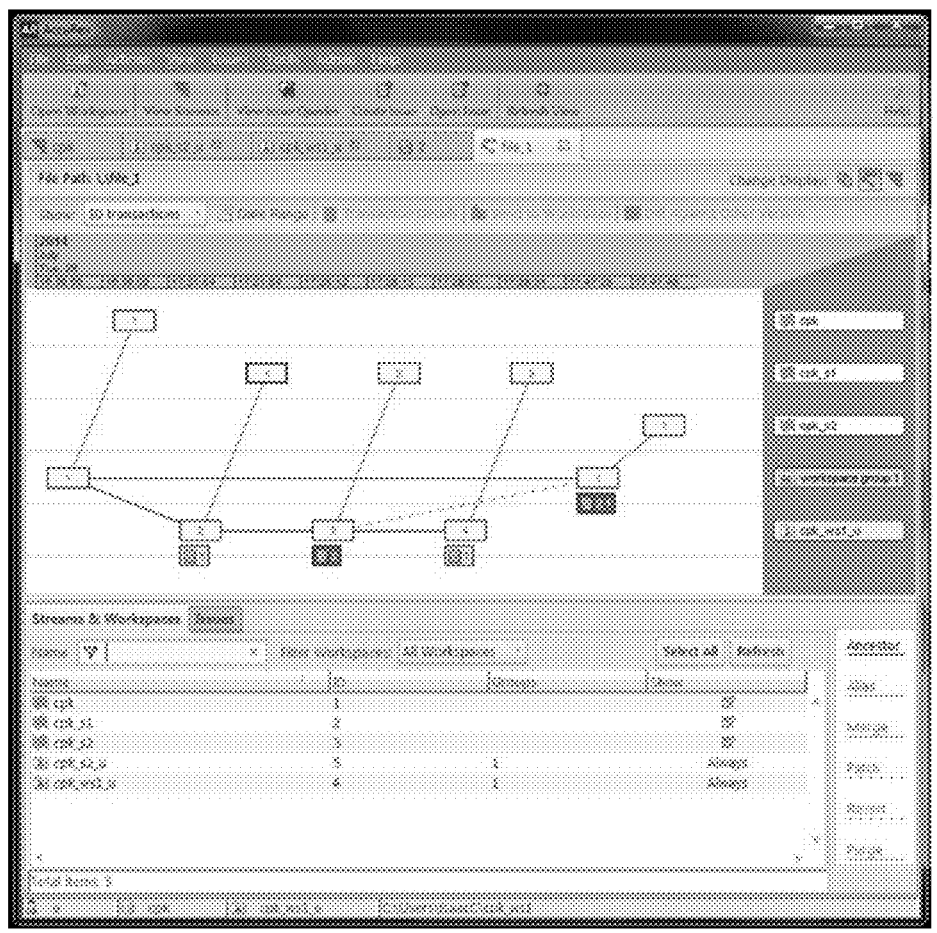

FIG. 10E is a user interface 1040 illustrating an element version history after a patch operation of change package #2 from stream cpk_s1 to stream cpk_s2. Variant #2.1 may be created by the patch operation, and logical changes in change package #2 may be applied to the file in cpk_s2, as shown. Note that in some embodiments, a merge operation may produce a similar element version history as a patch operation, resulting in the same variant creation.

Figure 10F:
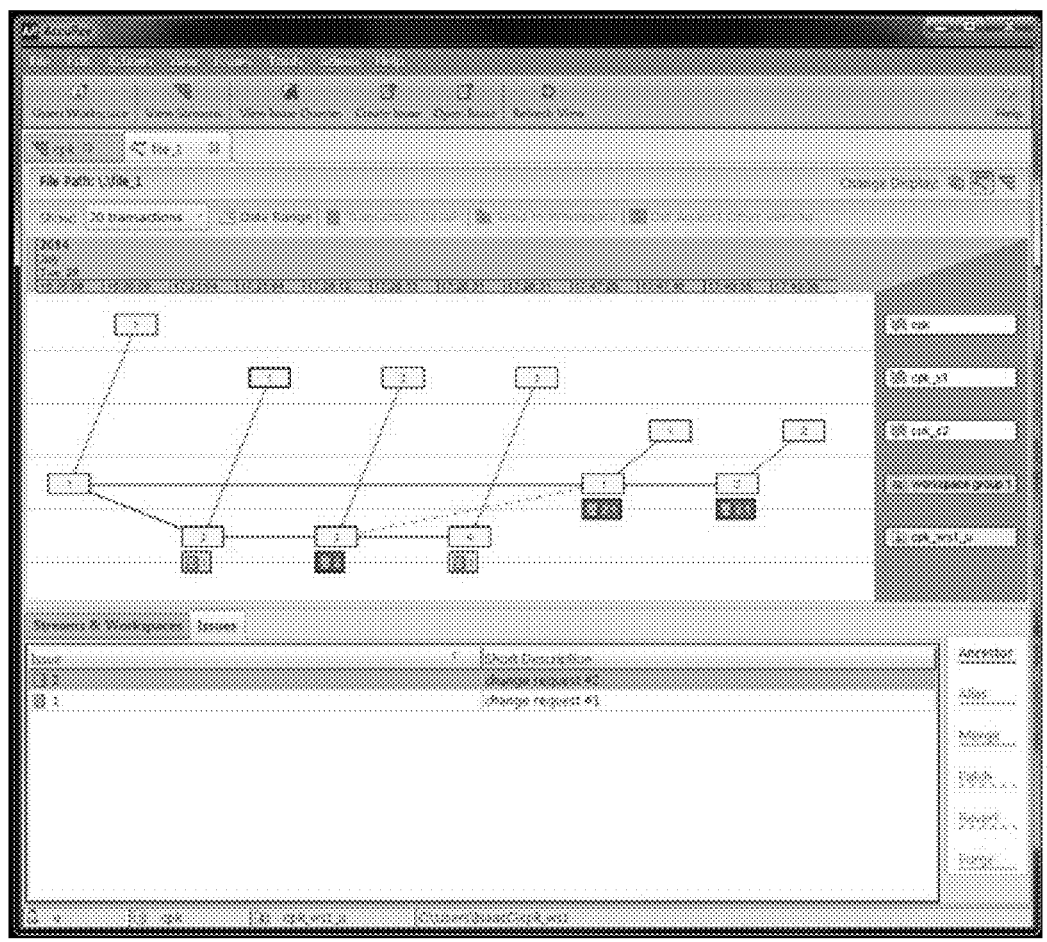

FIG. 10F is a user interface 1050 illustrating an element version history after amending a change package variant (e.g., #2.1). Version cpk_s2/s may have been added to variant #2.1. Variant #2.1 may be the variant level with the highest transaction number in stream cpk_s2. The original change package #2 in cpk_s1 may not see the new version and may stay complete in stream cpk_s1.

Figure 10G:
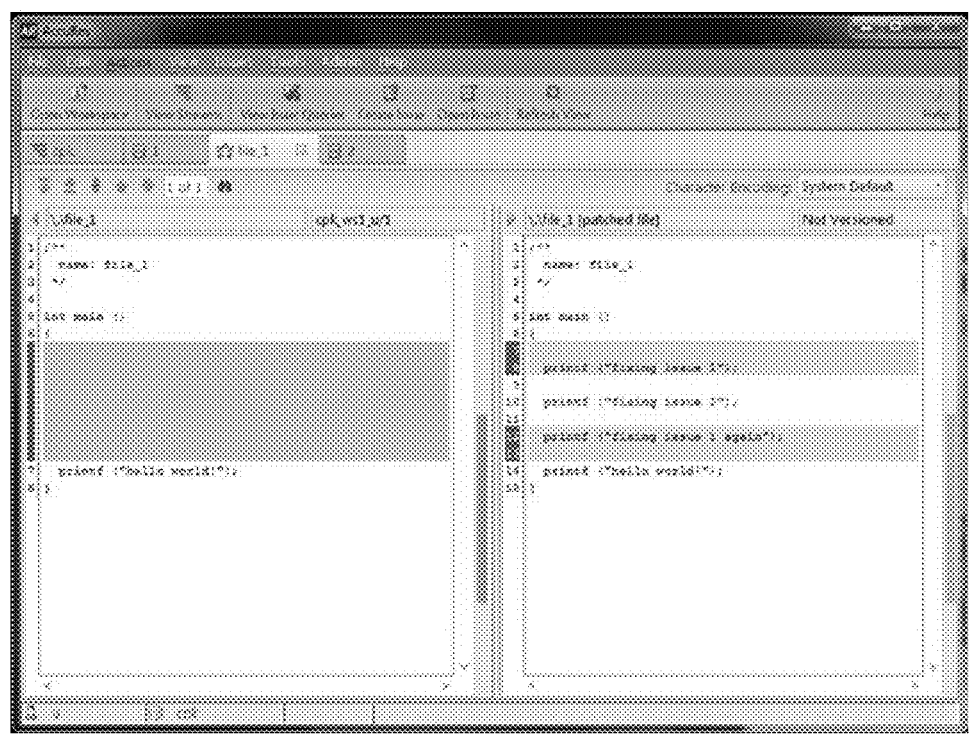

FIG. 10G is a user interface 1060 illustrating a diff of an element in a change package that may include two discrete segments. The highlighted lines on the right side of the interface 1060 may be included in the change package. The first set of highlighted lines (lines 7-8) may be part of a first segment in the change package, and the second set of highlighted lines (lines 12-13) may be part of a second segment in the change package.

Figure 10H:
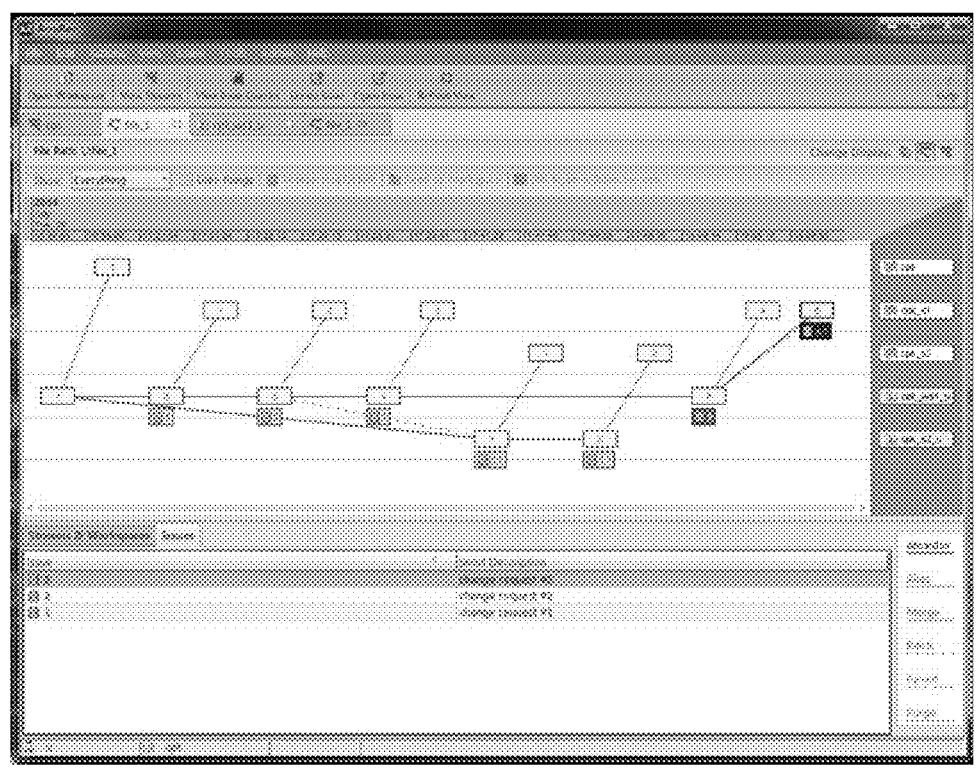

FIG. 10H is a user interface 1070 illustrating an element version history including a reverted change package variant #3.1 and an original change package #3.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

In addition, the terms "comprising", "including", etc. signify "including, but not limited to" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method comprising:
performing processing associated with receiving, with an editor module in communication with a processor, a first change to a configuration associated with a first segment;
performing processing associated with applying, with the editor module, the first change;
performing processing associated with receiving, with the editor module, a second change to the configuration associated with a second segment, the first segment and the second segment being non-consecutive segments associated with non-consecutive changes to the configuration;
performing processing associated with applying, with the editor module, the second change;
performing processing associated with generating, with a tracking module in communication with the processor, a change package comprising the first change and the second change, the change package comprising a separate entry for each segment, each entry including each change associated with the respective segment;
performing processing associated with determining, with the tracking module, whether the change package includes a complete set of changes required to complete a work item associated with the change package even though the first segment and the second segment are non-consecutive; and
performing processing associated with storing, with the tracking module, the change package in a database.

2. The method of claim 1, wherein the change package comprises a software component ID, a head version specification, a basis version specification, a transaction number, or an expiration, or a combination thereof.

3. The method of claim 1, further comprising:
performing processing associated with identifying, with a variance module in communication with the processor, a logical change associated with the change package; and
performing processing associated with creating, with the variance module, a change package variant comprising the logical change.

4. The method of claim 3, further comprising performing processing associated with applying, with the editor module, the change package variant to a second configuration.

5. The method of claim 4, wherein the applying comprises performing processing associated with selecting, with the editor module, the change package variant from among a plurality of change package variants within the configuration, the change package variant being a most recent of the plurality of change package variants within the configuration.

6. The method of claim 4, further comprising:
performing processing associated with analyzing, with a merging module in communication with the processor, a second configuration to identify a change necessary before applying the change package variant;
performing processing associated with changing, with the merging module, the second configuration according to the identified changes; and
performing processing associated with applying, with the editor module, the change package variant to the second configuration.

7. The method of claim 3, further comprising performing processing associated with analyzing, with the variance module, a second configuration to determine whether it is compatible with the change package variant.

8. The method of claim 7, wherein the analysis includes determining whether the second configuration includes every element required to apply the change package variant.

9. The method of claim 7, wherein:
when the second configuration is compatible, performing processing associated with applying, with the editor module, the change package variant to the second configuration; and
when the second configuration is not compatible, the change package variant is not applied.

10. The method of claim 3, further comprising performing processing associated with creating, with a patching module in communication with the processor, a patch comprising the change package variant.

11. The method of claim 1, further comprising performing processing associated with reverting, with a reverting module in communication with the processor, the first change or the second change.

12. The method of claim 1, further comprising:
performing processing associated with generating, with a diffing module in communication with the processor, a comparison of at least two configuration versions; and
performing processing associated with displaying, with the diffing module, the comparison on a display.

13. A system comprising:
a database;
a processor in communication with the database;
an editor module in communication with the processor, the editor module configured to:
perform processing associated with receiving a first change to a configuration associated with a first segment;
perform processing associated with applying the first change;
perform processing associated with receiving a second change to the configuration associated with a second segment, the first segment and the second segment being non-consecutive segments associated with non-consecutive changes to the configuration; and
perform processing associated with applying the second change; and
a tracking module in communication with the processor, the tracking module configured to:
perform processing associated with generating a change package comprising the first change and the second change, the change package comprising a separate entry for each segment, each entry including each change associated with the respective segment;
perform processing associated with determining whether the change package includes a complete set of changes required to complete a work item associated with the change package even though the first segment and the second segment are non-consecutive; and
perform processing associated with storing the change package in a database.

14. The system of claim 13, wherein the change package comprises a software component ID, a head version specification, a basis version specification, a transaction number, or an expiration, or a combination thereof.

15. The system of claim 13, further comprising a variance module in communication with the processor, the variance module configured to:

perform processing associated with identifying a logical change associated with the change package; and
perform processing associated with creating a change package variant comprising the logical change.

16. The system of claim 15, wherein the editor module is further configured to perform processing associated with applying the change package variant to a second configuration.

17. The system of claim 16, wherein the applying comprises performing processing associated with selecting the change package variant from among a plurality of change package variants within the configuration, the change package variant being a most recent of the plurality of change package variants within the configuration.

18. The system of claim 16, further comprising a merging module in communication with the processor, the merging module configured to:
perform processing associated with analyzing a second configuration to identify a change necessary before applying the change package variant; and
perform processing associated with changing the second configuration according to the identified changes; wherein
the editor module is further configured to perform processing associated with applying the change package variant to the second configuration.

19. The system of claim 15, wherein the variance module is further configured to perform processing associated with analyzing a second configuration to determine whether it is compatible with the change package variant.

20. The system of claim 19, wherein the analysis includes determining whether the second configuration includes every element required to apply the change package variant.

21. The system of claim 19, wherein:
the editor module is further configured to perform processing associated with applying the change package variant to the second configuration when the second configuration is compatible; and
when the second configuration is not compatible, the change package variant is not applied.

22. The system of claim 15, further comprising a patching module in communication with the processor, the patching module configured to perform processing associated with creating a patch comprising the change package variant.

23. The system of claim 13, further comprising a reverting module in communication with the processor, the reverting module configured to perform processing associated with reverting the first change or the second change.

24. The system of claim 13, further comprising a diffing module in communication with the processor, the diffing module configured to:
perform processing associated with generating a comparison of at least two configuration versions; and
perform processing associated with displaying the comparison on a display.

25. A method comprising:
performing processing associated with generating, with a tracking module in communication with the processor, at least one change package comprising at least two nonconsecutive changes to at least one configuration of at least one segment, the change package comprising a separate entry for each segment, each entry including each change associated with the respective segment;
performing processing associated with determining, with the tracking module, whether the change package includes a complete set of changes required to complete a work item associated with the change package even though two segments are non-consecutive;
performing processing associated with identifying, with a variance module in communication with the processor, a logical change associated with the change package; and
performing processing associated with creating, with the variance module, a change package variant comprising the logical change.

26. The method of claim 25, wherein the change package comprises a software component ID, a head version specification, a basis version specification, a transaction number, or an expiration, or a combination thereof.

27. The method of claim 25, further comprising performing processing associated with applying, with an editor module in communication with the processor, the change package variant to a second configuration.

28. The method of claim 27, wherein the applying comprises performing processing associated with selecting, with the editor module, the change package variant from among a plurality of change package variants within the configuration, the change package variant being a most recent of the plurality of change package variants within the configuration.

29. The method of claim 27, further comprising:
performing processing associated with analyzing, with a merging module in communication with the processor, a configuration to identify a change necessary before applying the change package variant;
performing processing associated with changing, with the merging module, the configuration according to the identified changes; and
performing processing associated with applying, with the editor module, the change package variant to the configuration.

30. The method of claim 27, further comprising performing processing associated with reverting, with a reverting module in communication with the processor, the application of the change package variant.

31. The method of claim 27, further comprising performing processing associated with analyzing, with the variance module, a configuration to determine whether it is compatible with the change package variant.

32. The method of claim 31, wherein the analysis includes determining whether the configuration includes every element required to apply the change package variant.

33. The method of claim 31, wherein:
when the configuration is compatible, performing processing associated with applying, with the editor module, the change package variant to the configuration; and
when the configuration is not compatible, the change package variant is not applied.

34. The method of claim 25, further comprising performing processing associated with creating, with a patching module in communication with the processor, a patch comprising the change package variant.

35. The method of claim 25, further comprising:
performing processing associated with generating, with a diffing module in communication with the processor, a comparison of at least two configuration versions; and
performing processing associated with displaying, with the diffing module, the comparison on a display.

36. A system comprising:
a processor;
a tracking module in communication with the processor, the tracking module configured to:
perform processing associated with generating at least one change package comprising at least two non-consecutive changes to at least one configuration of at least one segment, the change package comprising a separate entry for each segment, each entry including each change associated with the respective segment; and perform processing associated with determining, with the tracking module, whether the change package includes a complete set of changes required to complete a work item associated with the change package even though two segments are non-consecutive; and a variance module in communication with the processor, the variance module configured to:

perform processing associated with identifying a logical change associated with the change package; and perform processing associated with creating a change package variant comprising the logical change.

37. The system of claim 36, wherein the change package comprises a software component ID, a head version specification, a basis version specification, a transaction number, or an expiration, or a combination thereof.

38. The system of claim 36, further comprising an editor module in communication with the processor, the editor module configured to perform processing associated with applying the change package variant to a second configuration.

39. The system of claim 38, wherein the applying comprises performing processing associated with selecting, with the editor module, the change package variant from among a plurality of change package variants within the configuration, the change package variant being a most recent of the plurality of change package variants within the configuration.

40. The system of claim 38, further comprising a merging module in communication with the processor, the merging module configured to:

perform processing associated with analyzing a configuration to identify a change necessary before applying the change package variant; and perform processing associated with changing the configuration according to the identified changes; wherein the editor module is further configured to perform processing associated with applying the change package variant to the configuration.

41. The system of claim 38, further comprising a reverting module in communication with the processor, the reverting module configured to perform processing associated with reverting the application of the change package variant.

42. The system of claim 36, wherein the variance module is further configured to perform processing associated with analyzing a configuration to determine whether it is compatible with the change package variant.

43. The system of claim 42, wherein the analysis includes determining whether the configuration includes every element required to apply the change package variant.

44. The system of claim 42, wherein:

the editor module is further configured to perform processing associated with applying the change package variant to the configuration when the configuration is compatible; and when the configuration is not compatible, the change package variant is not applied.

45. The system of claim 36, further comprising a patching module in communication with the processor, the patching module configured to perform processing associated with creating a patch comprising the change package variant.

46. The system of claim 36, further comprising a diffing module in communication with the processor, the diffing module configured to:

perform processing associated with generating a comparison of at least two configuration versions; and perform processing associated with displaying the comparison on a display.

* * * * *